United States Patent
Engelhardt

(10) Patent No.: US 6,680,796 B2
(45) Date of Patent: Jan. 20, 2004

(54) MICROSCOPE ASSEMBLAGE

(75) Inventor: Johann Engelhardt, Bad Schoenborn (DE)

(73) Assignee: Leica Microsystems Heidelberg, GmbH, Mannheim (DE)

( * ) Notice: Subject to any disclaimer, the term of this patent is extended or adjusted under 35 U.S.C. 154(b) by 270 days.

(21) Appl. No.: 09/887,546

(22) Filed: Jun. 25, 2001

(65) Prior Publication Data
US 2002/0021491 A1 Feb. 21, 2002

(30) Foreign Application Priority Data
Jun. 23, 2000 (DE) .......................... 100 29 680

(51) Int. Cl.⁷ .......................... G02B 21/06; G02B 21/00
(52) U.S. Cl. .......................... 359/388; 359/368; 359/385
(58) Field of Search .................. 359/368–390; 356/338, 344, 401, 364

(56) References Cited

U.S. PATENT DOCUMENTS

| 4,893,008 | A | * | 1/1990 | Horikawa | 250/234 |
|---|---|---|---|---|---|
| 5,048,967 | A | * | 9/1991 | Suzuki et al. | 356/401 |
| 5,067,805 | A | * | 11/1991 | Corle et al. | 359/235 |
| 5,672,880 | A | * | 9/1997 | Kain | 250/458.1 |
| 5,754,291 | A | * | 5/1998 | Kain | 356/338 |
| 6,008,892 | A | * | 12/1999 | Kain et al. | 356/246 |
| 6,134,010 | A | * | 10/2000 | Zavislan | 356/364 |
| 6,310,687 | B1 | * | 10/2001 | Stumbo et al. | 356/317 |
| 6,428,171 | B1 | * | 8/2002 | Aoki et al. | 250/559.38 |

* cited by examiner

Primary Examiner—Thong Nguyen
(74) Attorney, Agent, or Firm—Crowell & Moring LLP

(57) ABSTRACT

A microscope assemblage, in particular a confocal laser scanning microscope, has a light source (1), for illumination of a specimen (6). An objective (5) is provided for guiding the illuminating light beam to the specimen (6). A device, having a tilt element, is provided for generating a relative motion between the illuminating light beam and the specimen (6). The device and the tilt are configured so that the illuminating light beam is rotatable in the objective pupil.

15 Claims, 5 Drawing Sheets

MICROSCOPE ASSEMBLAGE

FIELD OF THE INVENTION

The invention concerns a microscope assemblage, in particular a confocal laser scanning microscope.

BACKGROUND OF THE INVENTION

Microscope assemblages of the kind cited above are known from practical use and exist in a wide variety of embodiments. The known microscope assemblages are often configured as confocal laser scanning microscopes. In confocal laser scanning microscopy, a specimen is scanned with a light beam. A confocal scanning microscope generally comprises a light source, a focusing optical system with which the light of the source is focused onto an aperture stop, a beam splitter, a scanning apparatus for beam control that serves as a device for generating a relative motion between the illuminating light beam and the specimen, a microscope optical system, a detection pinhole, and detectors for detecting the detected light or fluorescent light. The illuminating light is usually coupled in via the beam splitter. The focal point of the light beam is generally moved in a specimen plane by tilting two mirrors, the deflection axes usually being perpendicular to one another so that one mirror deflects in the X direction and the other in the Y direction. Tilting of the mirrors is brought about, for example, with the aid of galvanometer positioning elements. In the descan arrangement that is most common, the fluorescent light or reflected light coming from the specimen arrives back, via the same scanning mirror, at the beam splitter and passes through it in order then to be focused on the detection pinhole behind which the detectors are located. Detected light that does not derive directly from the focus region takes a different path and does not pass through the detection pinhole; what is obtained is therefore a point datum that, as a result of scanning of the specimen, yields a three-dimensional image.

A detection pinhole can be dispensed with in the case of two-photon excitation, since the excitation probability depends on the square of the photon density (intensity-squared proportionality), which of course is much higher at the focus than in the adjacent regions. It is therefore very probable that most of the fluorescent light that is to be detected derives from the focus region, thus rendering superfluous any further differentiation, using a pinhole arrangement, between fluorescence photons from the focus region and fluorescence photons from the adjacent regions. Detection of the transmitted light or condenser-side detection of the fluorescent light can, however, also be helpful in the context of one-photon excitation.

Conventional scanning microscopes are too slow for real-time observation of the specimen. Scanning an image takes up to one second or more, depending on resolution. To speed up the scanning operation, it is possible to illuminate several specimen points simultaneously. For two-photon excitation, DE 196 53 413 and EP 0 753 779 disclose arrangements that use rotating microlens disks; usually 20 to 50 specimen points are simultaneously illuminated with femtosecond pulses.

Journal of Microscopy, Vol. 181, Part 3, March 1996, pp. 253–259 discloses a microscope assemblage in which a light beam generated by a laser is expanded into a line-shaped illuminating light beam by a means for spreading the light beam. This allows an entire line in the specimen to be illuminated simultaneously with a linear focus. The scanning operation can thus be reduced to one dimension. In this context, a double-sided mirror serves as the device for generating a relative motion between the illuminating light beam and the specimen. In other words, the light beam is scanned over the specimen to make possible real-time observation of the specimen.

In order to perform a real-time observation of this kind in the context of the known microscope assemblages, it is usually necessary to integrate an additional intermediate optical system into the microscope assemblage. An intermediate optical system of this kind inevitably results, however, in a reduction in light output. Because of this reduction in light output, safe real-time observation of the specimen is often no longer possible.

SUMMARY OF THE INVENTION

It is therefore the object of the present invention to describe a microscope assemblage of the kind cited initially with which real-time observation of a specimen is possible by using a simple and cost effective design.

The aforesaid object is achieved, according to the present invention, by a microscope assemblage comprising a light source, that generates a light beam for illumination of a specimen; a means for spreading the light beam into a substantially line-shaped illuminating light beam; an objective for guiding the illuminating light beam to the specimen wherein the objective defines a objective pupil; a device for generating a relative motion between the illuminating light beam and the specimen, wherein the device rotates the illuminating light beam in the objective pupil.

It is another object of the present invention to describe a confocal microscope of the kind cited initially with which real-time observation of a specimen is possible by using a simple and cost effective design.

The above object is achieved by a confocal microscope, comprising a laser light source, that generates a light beam for illumination of a specimen; a means for spreading the light beam into a substantially line-shaped illuminating light beam; an objective, defining an objective pupil, for guiding the illuminating light beam to the specimen; and a device for generating a relative motion between the illuminating light beam and the specimen, wherein the device rotates the illuminating light beam in the objective pupil.

What has been recognized according to the present invention is firstly that safe real-time observation is possible even without light-output-reducing intermediate optical systems. For that purpose, also according to the present invention, the device for generating a relative motion between the illuminating light beam and the specimen is configured in such a way that the illuminating light beam is rotatable in the objective pupil by means of the device. With an arrangement of this kind, there is no further need for an intermediate optical system in the microscope assemblage. As a consequence, no additional reduction in light output is present in the entire beam path, thus making possible, in simple fashion, safe real-time observation of the specimen without light output losses.

As an alternative to this, the device for generating a relative motion between the illuminating light beam and the specimen is configured in such a way that the specimen is movable at least one-dimensionally by means of the device. This provides a kind of specimen scanning so that, in very simple fashion, the microscope assemblage can remain unchanged along the entire beam path to the specimen. Guidance of the line-shaped illuminating light beam over the specimen is therefore accomplished not by moving the illuminating light beam, but by moving the specimen. This results in a particularly simple configuration of a microscope assemblage which makes possible safe real-time observation of the specimen with means of simple design.

In the case where the device for generating a relative motion between the illuminating light beam and the specimen is configured in such a way that the illuminating light beam is rotatable in the objective pupil by means of the device, the device could have a tilt element for tilting the light source. This makes possible a tilting of the light beam at the beginning of the beam path. It is possible in this context to use a tilt element or an apparatus for pivoting a light beam such as is known from the present applicant's German patent application 100 04 661. 4 (U.S. Patent Application Publication No. US 2001/0014195 A1 claiming priority of the German patent application).

In particularly simply designed fashion, the device could be constituted by a beam splitter. The beam splitter with which the illuminating light beam is coupled into the beam path could be used.

For tilting a beam splitter, the device could have a particular tilt element and the beam splitter could be arranged on the tilt element. The aforementioned tilt element that is based on a development by the present applicant could once again be used as the tilt element. This, too, makes possible rotation of the light beam in the objective pupil.

A further possibility for configuring the microscope assemblage could be achieved by the fact that the device is arranged after a beam splitter. What is significant here as well is that a rotation of the light beam in the objective pupil is made possible.

Various components could be used as beam splitters. In particularly advantageous fashion, the beam splitter could be a dichroic filter or dichroic beam splitter. This would allow the eye to be protected from the exciting light in the context of the desired naked-eye observation of the image.

In a concrete embodiment, the light beam or the exciting light could be pulsed. The type of pulsing is to be adapted to the particular application.

A variety of components could be used as the means for spreading the light beam. It has been found in practical use that a means for spreading the light beam having a cylindrical optical system is particularly simple and reliable.

A detector in the form of at least one CCD chip could be provided for detection. Alternatively, a detector in the form of at least one photodiode array could be provided. A wide variety of chips and arrays are available on the market in this context.

When the device or a tilting arrangement is arranged after the beam splitter or main beam splitter, only a line detector, for example a photodiode cell, is necessary.

With the microscope assemblage according to the present invention it is possible, in particular, to observe the image directly with the naked eye; in this context, the eye should be protected from the exciting light, in particular the exciting laser light, for example with a suitable filter. For this purpose, the main beam splitter or the beam splitter could be a dichroic filter.

In the context of two-photon excitation, the detection slit stop can be dispensed with. The assemblage is then advantageously reduced to a few mechanical and optical elements.

BRIEF DESCRIPTION OF THE DRAWINGS

There are various ways of advantageously embodying and developing the teaching of the present invention. The reader is referred, for that purpose to the description and to the drawings. In the drawings.

DETAILED DESCRIPTION OF THE INVENTION

Figure 1:
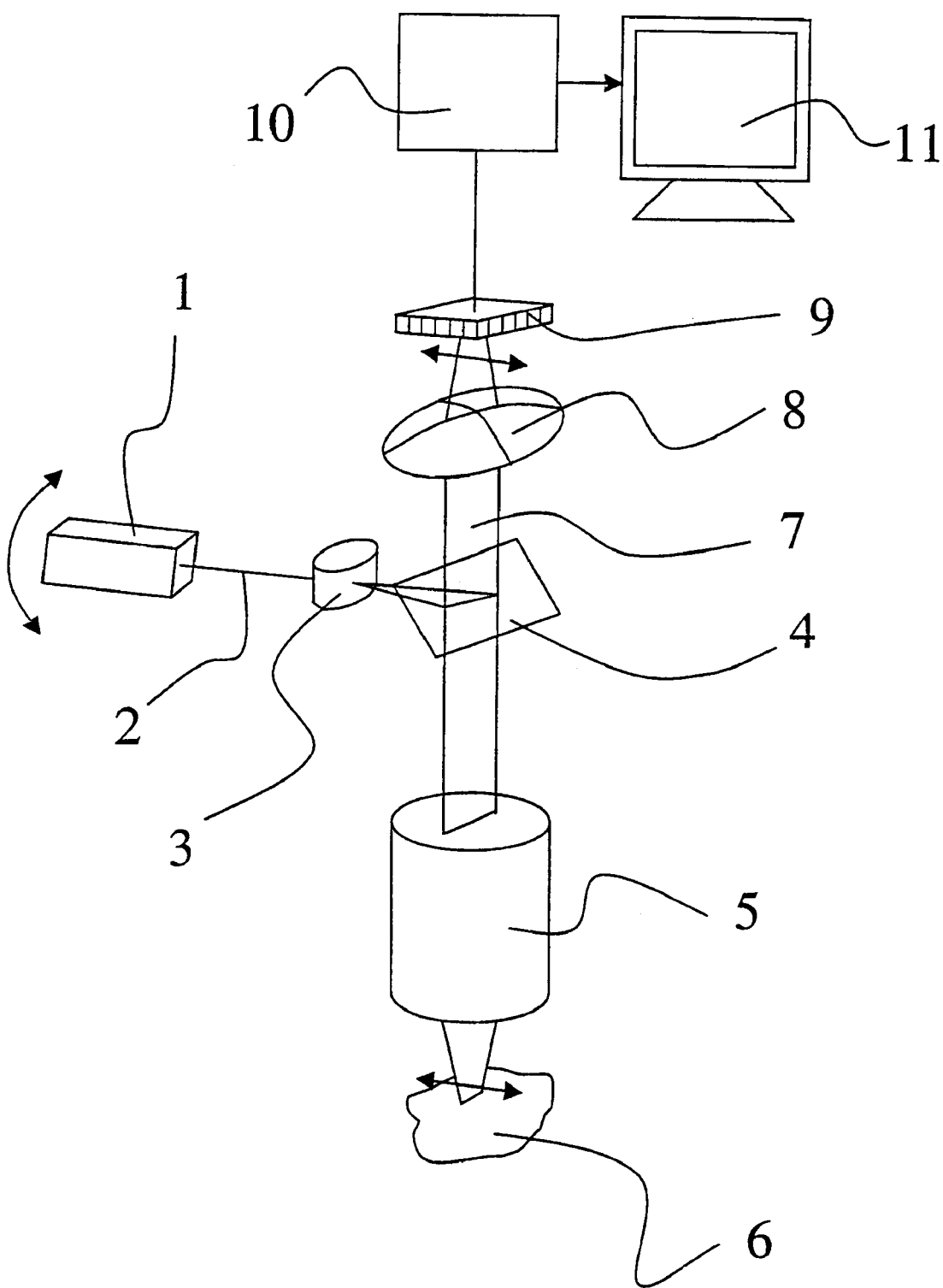
FIG. 1 shows, in a schematic perspective depiction, an exemplary embodiment of a microscope assemblage according to the present invention.

FIG. 1 shows an exemplary embodiment of a microscope assemblage according to the present invention, in a perspective and schematic general depiction. An arrangement for two-photon excitation is depicted. The pulsed light beam 2 generated by a light source 1 is spatially expanded in one direction with a means 3 for spreading light beam 2 in the form of a cylindrical-lens optical system, and directed via a dichroic beam splitter 4 onto an objective 5. A specimen 6 can be scanned line by line by means of a device for generating a relative motion between light beam 2 and specimen 6. A detected light 7 is focused by means of a focusing optical system 8, and detected by a CCD chip 9. Signal processing is accomplished by means of an electronic system or computer unit 10 which forwards the image data to a computer 11 for display.

In the exemplary embodiment shown, light source 1 is a laser light source. It is essential in the context of the microscope assemblage that a device for generating a relative motion between the illuminating light beam and specimen 6 is provided. In the interest of the possibility of safe real-time observation of specimen 6, the device is configured in such a way either that the illuminating light beam is rotatable in the objective pupil by means of the device, or that specimen 6 is movable at least one-dimensionally by means of the device. In the exemplary embodiment shown in FIG. 1, light beam 2 is tiltable by means of the device. For that purpose, the illumination system or light source 1 is mounted on a tilt element of the device.

Figure 2:
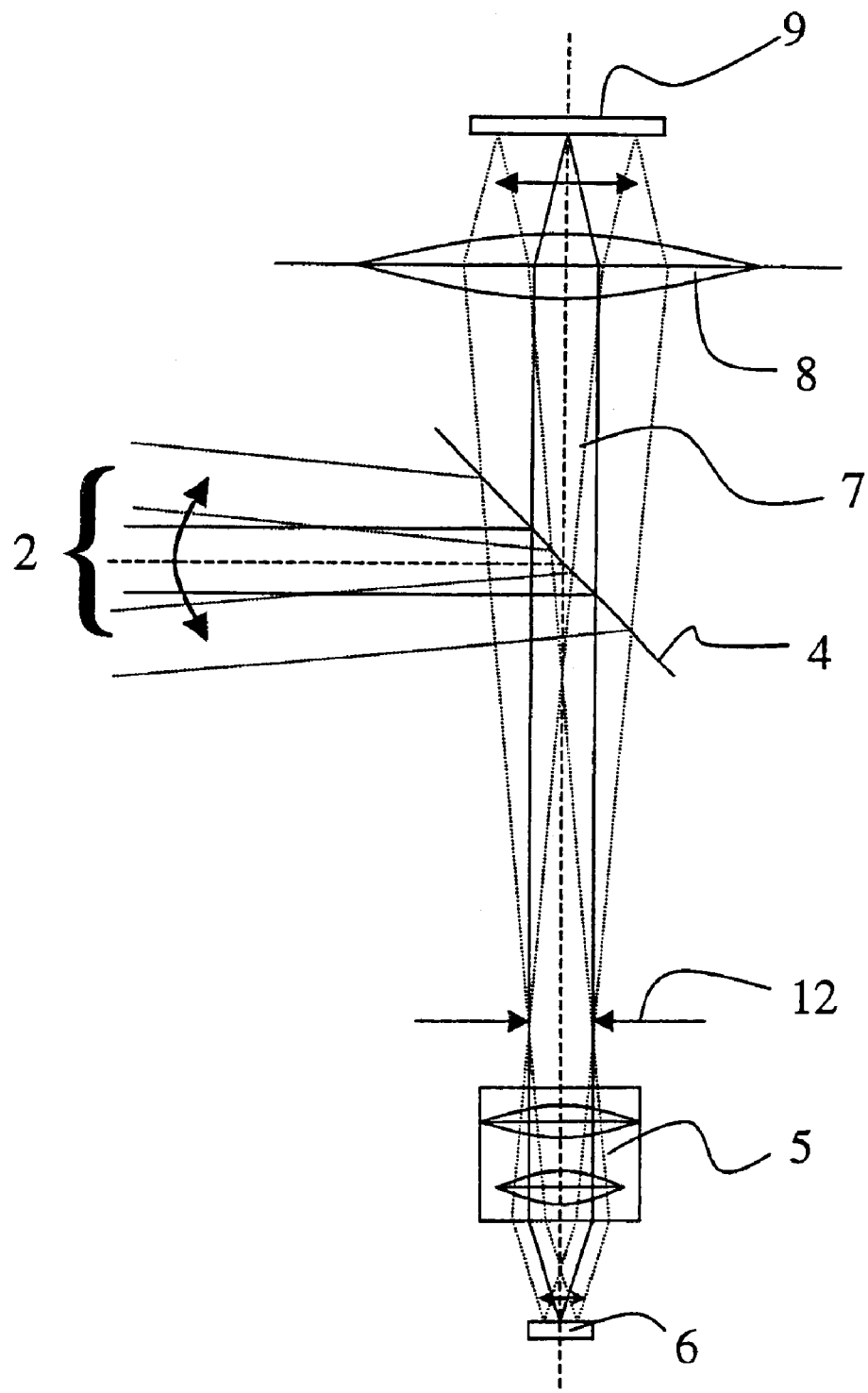
FIG. 2 shows the exemplary embodiment of FIG. 1, in a schematic and partial side view.

FIG. 2 shows the exemplary embodiment of FIG. 1 in a schematic and partial side view. The tilting of light beam 2 is particularly evident; the tilting can be performed in such a way that the illuminating light beam rotates in objective pupil 12. Two-photon excitation takes place in the exemplary embodiment that is shown.

Figure 3:
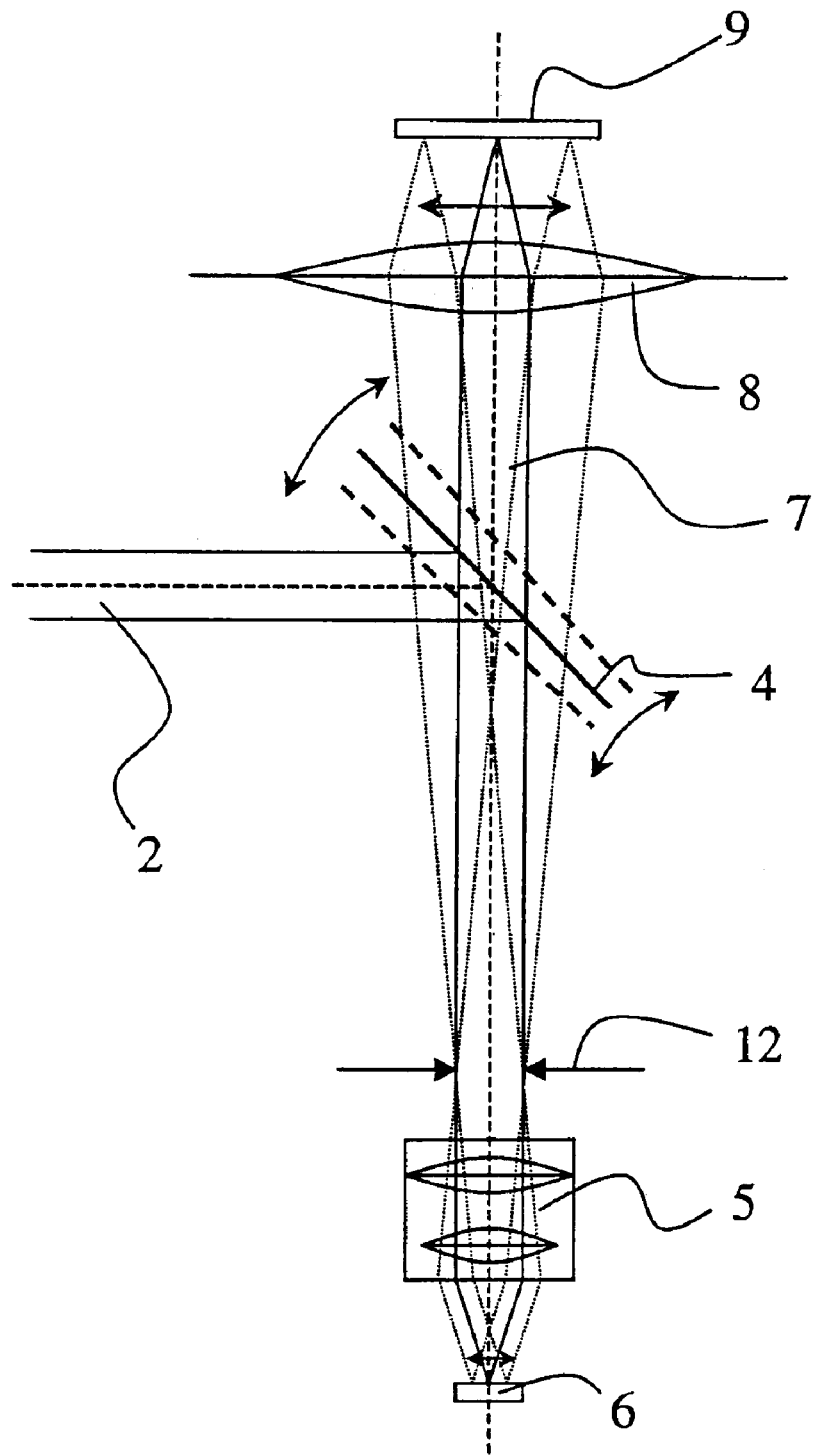
FIG. 3 shows a second exemplary embodiment of a microscope assemblage according to the present invention, in a schematic side view.

FIG. 3 shows, in a schematic side view, a second exemplary embodiment of a microscope assemblage according to the present invention, identical reference numbers being used for components identical to those in the first exemplary embodiment. In the second exemplary embodiment, beam splitter 4 or the main beam splitter is arranged tiltably in such a way that it serves as a scanning apparatus or as a device for generating a relative motion between the illuminating light beam and specimen 6. Here as well, the illuminating light beam is rotated in objective pupil 12.

Figure 4:
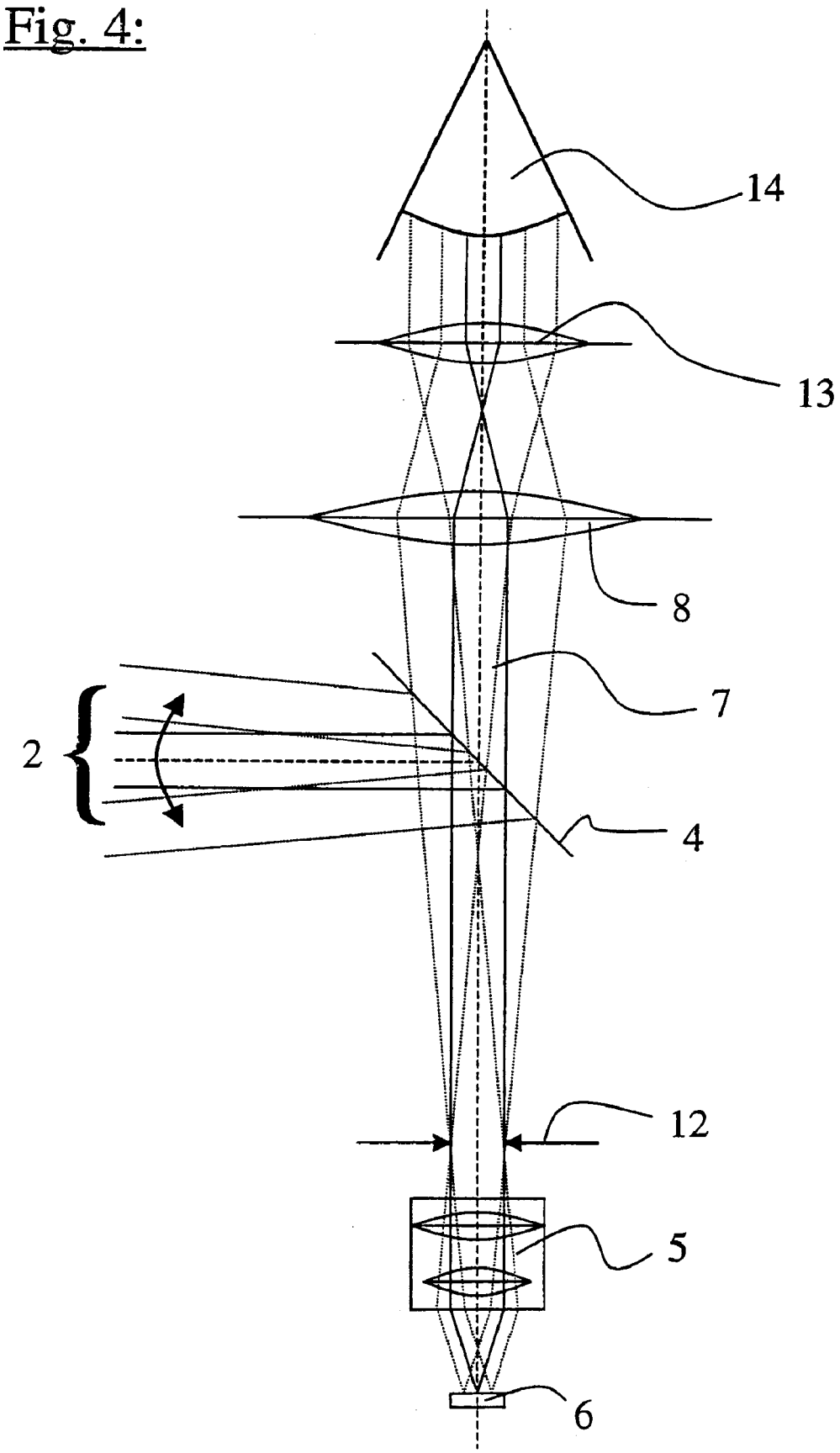
FIG. 4 shows a third exemplary embodiment of a microscope assemblage according to the present invention, in a schematic side view.

FIG. 4 shows, in a schematic side view, a third exemplary embodiment of a microscope assemblage according to the present invention, the assemblage being configured for direct observation by the user. For that purpose, the assemblage has an eyepiece 13 for an observer 14. The configuration of the third exemplary embodiment otherwise corresponds to the configuration of the first exemplary embodiment.

Figure 5:
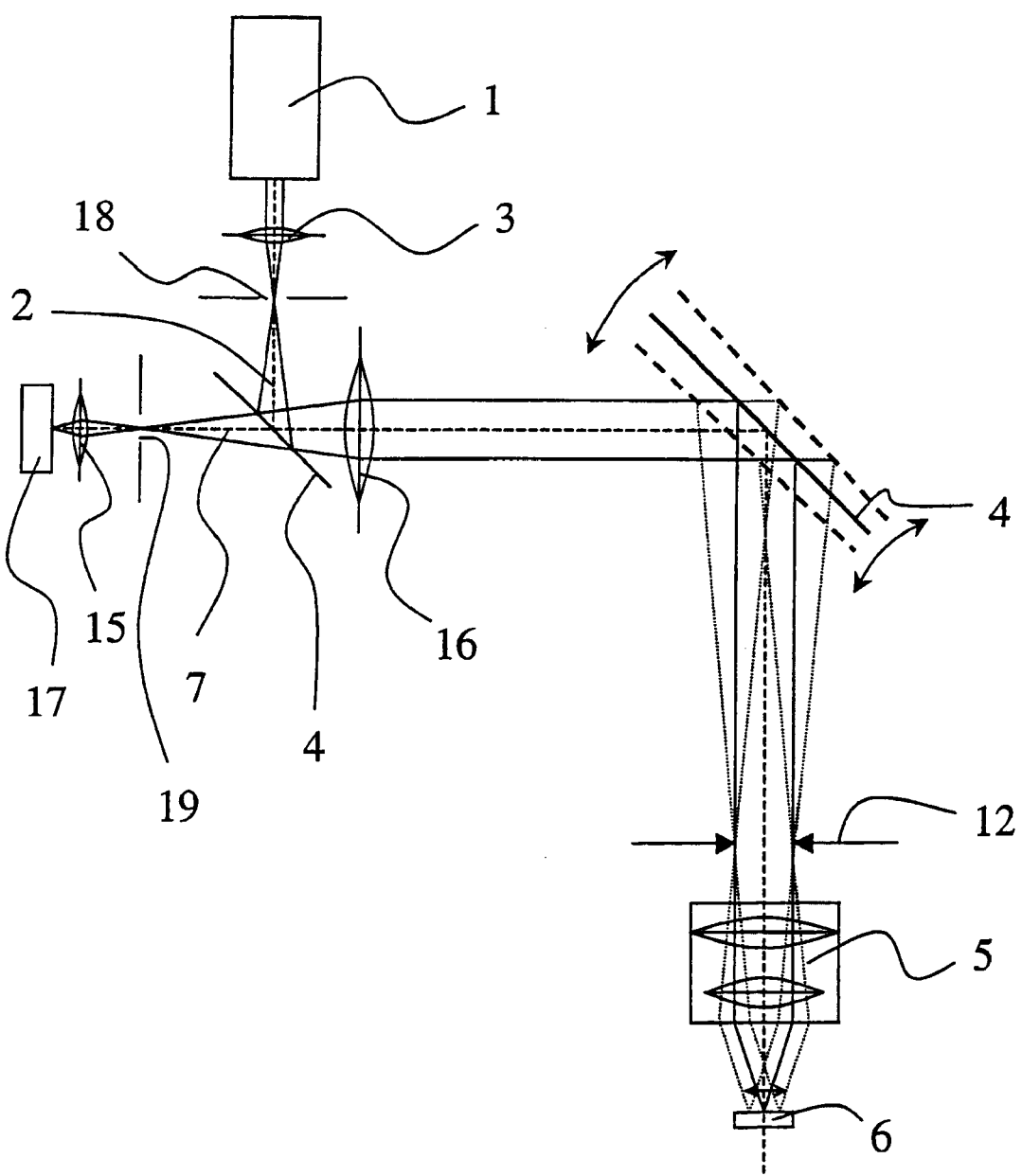
FIG. 5 shows a fourth exemplary embodiment of a microscope assemblage according to the present invention, in a schematic side view.

FIG. 5 shows, in a schematic side view, a fourth exemplary embodiment of a microscope assemblage according to the present invention. This is an arrangement with one-photon excitation, or for reflected observation. Additional optical systems 15 and 16 are inserted for that purpose.

A line detector 17 is provided as the detector. In addition, an exciting light slit stop 18 or illumination slit stop is used, as well as a detection slit stop 19.

The device for generating a relative motion between the illuminating light beam and specimen 6 is arranged, in the form of a beam splitter after the actual main beam splitter. It is thus sufficient to use only one line detector 17 and no area detector.

To avoid repetition, the reader is referred to the general portion of the description and to the appended claims regarding further advantageous embodiments and developments of the microscope assemblage according to the present invention.

In conclusion, be it noted expressly that the exemplary embodiments described above are intended merely for discussion of the teaching claimed, but do not limit it to those exemplary embodiments.

PARTS LIST

1 Light source
2 Light beam
3 Means for spreading the light beam
4 Beam splitter
5 Objective
6 Specimen
7 Detected light
8 Focusing optical system
9 CCD chip
10 Computer unit
11 Computer
12 Objective pupil
13 Eyepiece
14 Observer
15 Optical system
16 Optical system
17 Line detector
18 Excitation light slit stop
19 Detection slit stop

What is claimed is:

1. A microscope assemblage, comprising a light source, that generates a light beam for illumination of a specimen; a means for spreading the light beam into a substantially line-shaped illuminating light beam; an objective for guiding the illuminating light beam to the specimen wherein the objective defines an objective pupil; a device for generating a relative motion between the illuminating light beam and the specimen, wherein the device comprises a tilt element for rotating the illuminating light beam in the objective pupil serving as a scanning device for scanning the line-shaped illuminating light beam across the specimen.

2. The microscope assemblage as defined in claim 1, wherein the light source is mounted on the tilt element for tilting the light source.

3. The microscope assemblage as defined in claim 1, wherein the device includes a beam splitter and the tilt element tilts the beam splitter.

4. The microscope assemblage as defined in claim 2, wherein the beam splitter consists essentially of a dichroic filter and a dichroic beam splitter.

5. The microscope assemblage as defined in claim 1, wherein the means for spreading the light beam has a cylindrical optical system.

6. The microscope assemblage as defined in claim 1, wherein a detector is provided consisting essentially of at least one CCD chip, at least one photodiode array, a line detector and a photodiode cell.

7. A confocal laser scanning microscope, comprising a laser light source, that generates a light beam for illumination of a specimen; a detector for detecting the light coming from the specimen; means for spreading the light beam into a substantially line-shaped illuminating light beam; an objective, defining an objective pupil, for guiding the illuminating light beam to the specimen; and a device for generating a relative motion between the illuminating light beam and the specimen, wherein the device comprises a tilt element for rotating the illuminating light beam in the objective pupil serving as a scanning device for scanning the line-shaped illuminating light beam across the specimen.

8. The confocal laser scanning microscope as defined in claim 7 wherein the light source is mounted on the tilt element for tilting the light source.

9. The confocal laser scanning microscope as defined in claim 7 wherein the device includes a beam splitter and the tilt element tilts the beam splitter.

10. The confocal laser scanning microscope as defined in claim 9 wherein the beam splitter consists essentially of a dichroic filter and a dichroic beam splitter.

11. The confocal laser scanning microscope as defined in claim 7 wherein the means for spreading the light beam has a cylindrical optical system.

12. The confocal laser scanning microscope as defined in claim 7 wherein the detector consists essentially of at least one CCD chip, at least one photodiode array, a line detector and a photodiode cell.

13. The confocal laser scanning microscope as defined in claim 7 wherein the light beam is pulsed.

14. A microscope assemblage, comprising:

a light source generating a light beam for illuminating a specimen;

means for spreading the light beam into a substantially line-shaped illuminating light beams;

an objective for guiding the illuminating light beam to the specimen;

a tilt element for tilting the light source so as to generate relative motion between the illuminating light bean and the specimen in order to scan the line-shaped illuminating light beam across the specimen.

15. A confocal laser scanning microscope, comprising:

a light source generating a light beam for illuminating a specimen;

means for spreading the light beam into a substantially line-shaped illuminating light beam;

an objective for guiding the illuminating light beam to the specimen;

a tilt element for tilting the light source so as to generate relative motion between the illuminating light beam and the specimen in order to scan the line-shaped illuminating light beam across the specimen.

* * * * *